Figure 1:
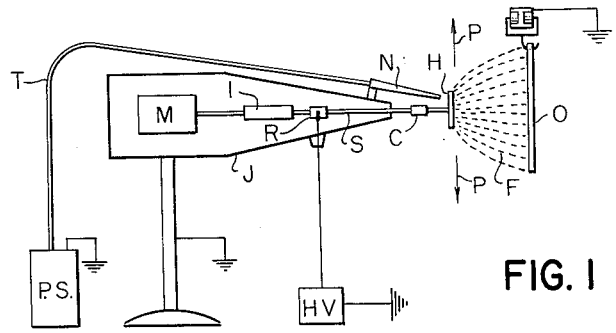

April 16, 1963 H. V. SCHWEITZER ETAL 3,085,749
ELECTROSTATIC SPRAY HEADS
Filed Aug. 8, 1960 3 Sheets-Sheet 1

INVENTOR.
RICHARD J. VERBA
BY HOWARD V. SCHWEITZER
Ely, Pearne & Gordon
ATTORNEYS April 16, 1963    H. V. SCHWEITZER ETAL    3,085,749
ELECTROSTATIC SPRAY HEADS Filed Aug. 8, 1960    3 Sheets-Sheet 2

INVENTORS
RICHARD J. VERBA
HOWARD V. SCHWEITZER
BY *Ely, Pearne + Gordon*
ATTORNEYS United States Patent Office 3,085,749
Patented Apr. 16, 1963

3,085,749
ELECTROSTATIC SPRAY HEADS
Howard V. Schweitzer, Fort Lauderdale, Fla., and Richard J. Verba, Rocky River, Ohio, assignors to Schweitzer Electrostatic Company, Cleveland, Ohio, a corporation of Ohio
Filed Aug. 8, 1960, Ser. No. 48,800
19 Claims. (Cl. 239—15)

This invention relates to an improvement in electrostatic spray heads and, more particularly, to spray heads which improve the distribution in and confinement to an established electrostatic field of particles or droplets dispersed in said field. The improved heads are especially useful in equipment for coating paints (including enamels, lacquers, ceramic coatings, etc.) on an intended receiving surface. This application is a continuation-in-part of our application for "Electrostatic Spray Head," Serial No. 599,530, filed July 23, 1956, now abandoned, without any abandonment of the inventions disclosed and/or claimed therein, in favor of this present application.

Electrostatic spray equipment has long been used for applying coating compositions to objects; for spinning collodion, lacquers, etc., into synthetic fiber staples; for applying discrete solid particles, such as grit and flock to adhesive surfaces; for concentrating liquids such as milk, etc.; and/or the like. The fundamental principle in any such operation is that, in discharging material (such as a liquid or a fluid-like mass of solid particles) into an electrostatic field extending to a receiving surface, electrostatic charges are presumably imposed on the material. These charges cause a further dispersion of the material (atomization or attenuation in the case of liquids and special orientation in the case of discrete solid particles) due to the repelling effect of charges of the same polarity on each particle (solid or liquid) of the material and, simultaneously, attract the particles to a receiving surface. The receiving surface either has a charge actually or effectively opposite in polarity to the particles. If the receiving surface is not actually of a polarity opposite to the charge on the particles, an effectively opposite charge may be imposed in several ways. For example, the receiving surface may be of the same polarity but of a lesser potential than the source in the electrostatic field from which the particles received their charge. Also, the receiving surface itself may be non-conductive and carry no charge but simply be interposed in the path of travel of the charged particles in the electrostatic field toward a conductive surface or point, whereby the receiving surface intercepts (and usually holds) the charged particles.

Whether liquid particles dispersed in the above-described system are still liquid when received upon the receiving surface, a fine powder, attenuated fibers, or merely a concentrate from which a volatile component evaporated in the course of travel between the spray head and receiving surface depends upon the physical characteristics of the liquid and the condition and type of atmosphere through which the liquid passes between the head and receiving surface. Thus, if a relatively "long" liquid having a volatile solvent, such as collodion, is sprayed and a suitable distance is provided, it will form clusters of fibers on the receiving surface, which fibers may then be removed and spun into textile yarns, for example. If the liquid is "short" and has a highly volatile solvent, as in the case of certain wax solutions, the sprayed material may be collected as a fine powder on the receiving surface. If the liquid be a paint or lacquer having at least some relatively lower volatile solvents in its composition, it usually will be deposited in liquid form on the receiving surface and, depending upon the amount deposited on a given area, will form a coating film. If the liquid should be a so-called "hot melt" paint, whether the receiving surface will receive a powder or film-forming coating will depend on the temperature of the atmosphere and the temperature of the paint before atomization. Also, depending on the atmospheric temperature and/or pressure, milk, for example, may be either concentrated or powdered, depending on the amount of liquid evaporated during atomization.

Other conditions and characteristics which appear to affect the condition of particles (sprayed on in the form of a liquid from an atomizing head) when received on a receiving surface include the time of travel from the atomizing head to the receiving surface and the dielectric characteristics of the sprayed liquid (which may include pigmented liquids). Other conditions being equal, a liquid having a volatile solvent will be received on a receiving surface in a drier, more nearly powdered form if it requires a greater time to travel from the atomizing head to the receiving surface than the same liquid requiring a short time of travel. The dielectric strength of a liquid being electrostatically sprayed affects the condition in which the liquid is received on the receiving surface in this fashion: Liquids of high dielectric strength appear to carry lesser charges when atomized than liquids of lower dielectric strength, and thus appear to depend more upon the mechanical atomization effected by an electrostatically charged spray head than liquids which have a lower dielectric strength. For example, assuming a lacquer of relatively high dielectric strength (e.g., a lacquer having a phenolic or polyester resin base) and a lacquer of relatively low dielectric strength (e.g., a lacquer having a nitrocellulose base) are otherwise equal in viscosity, surface tension, proportion of volatile solvents of substantially equal volatility, conductivity, etc., are sprayed under equal conditions, the lacquer of lower dielectric strength will be received on the receiving surface in a drier condition than the lacquer of higher dielectric strength. The explanation for this result appears to be that the more conductive lacquer is more finely atomized by the electrostatic forces acting on the particles mechanically atomized by the spray head. Such finer atomization increases the surface presented for evaporation during the time of travel from the spray head to the receiving surface.

Those skilled in the art employing spray heads made according to this invention in electrostatic spraying must, for best results, bear the foregoing general conditions and requirements in mind in formulating the liquid or establishing the line of travel between the spray head and receiving surface if the heads are to be used for coating, evaporating, fiber or powder production, or like uses.

Regardless of the use to which an electrostatically-charged spray is put, a principal object of any spray head is to impart an electrostatic charge to each particle during (and preferably at the commencement of) the travel from the spray head to the receiving surface. As between nozzles, air spray guns, centrifugal devices, traveling belts, etc., centrifugal heads have generally been the most convenient, especially in the application of coatings, to which this invention is particularly directed. The centrifugal device, heretofore a circular disk or cup, will, even at relatively slow speeds, do a fair job of atomization in a plane perpendicular to the axis of rotation without an electrostatic field being imposed. When an electrostatic field of high potential is imposed between the disk or cup and the receiving surface to be coated (which is usually located in front of the disk or cup), the charge imparted to the liquid particles when they leave the spray head will tend to atomize the particles further or, at least, atomize them to a more uniform size and impart to them a component of movement toward the intended receiving surface or object. In fact, because the component of movement of the spray particles from a centrifugal head to the object usually can be attributable largely if not solely to the electrostatic field in which the particle moves, it has long been the goal of the art to provide a head from which the particles would move toward the object only along the lines of electrostatic force between the head and the object and, thus, the particles would deposit only on the object. Thereby complete utilization of the paint would be obtained and no over-spray would result. Unfortunately, in any atomizing head developed so far, the combination of mechanical and electrostatic forces have been insufficient to handle a practical workable volume of paint and, at the same time, so thoroughly atomize the paint that the electrostatic forces completely overcome the centrifugal impetus imparted to the spray particles by the spray head. As a consequence, some particles may have a momentum which carries them outside the effect of the electrostatic field and so-called "over-spraying" can result. An object of this invention is to provide a spray head which thoroughly atomizes paint and like liquids so that the particles are relatively mass-less and over-spraying is minimized.

Another difficulty with prior art centrifugal electrostatic spray heads is that the heads have been designed to provide a circular discharge edge substantially concentric with the axis of rotation and frequently fairly intricate or elaborate means have had to be employed to distribute the paint more or less evenly to this circular discharge edge. Such spray heads and the means for distributing paint to the circular edges are frequently difficult to clean or change. When a change in the color or type of coating composition is required during production, excessive down-time to change or clean the heads may render the whole coating set-up uneconomical or undesirably inconvenient. An object of this invention is to provide a spray head which can be easily cleaned or changed with a minimum of down-time.

Other objects and advantages of this invention will be apparent from the following specification, claims, and drawings, in which:

FIGURE 1 is a diagrammatic showing of an electrostatic coating equipment set-up suitable for improved centrifugal spray heads made according to this invention.

FIGURE 2 is a front elevation of one embodiment of a spray head made according to this invention.

FIGURE 3 is a cross-section taken along the line 3—3 of FIGURE 2.

FIGURE 4 is a front elevation of another embodiment of a spray head made according to this invention.

FIGURE 5 is a cross-section taken along the line 5—5 of FIGURE 4.

FIGURE 6 is a front elevation of still another embodiment of this invention.

FIGURE 7 is a cross-section taken along the line 7—7 of FIGURE 6.

FIGURE 8 is a fragmentary detail of a modification of the embodiment shown in FIGURE 6.

FIGURE 9 is a detail, corresponding to FIGURE 8, of a further modification of the embodiment shown in FIGURE 8.

FIGURE 10 is a detail, in cross-section, of a still further modification of the embodiment shown in FIGURE 8.

FIGURE 11 is a cross-section of a further embodiment.

FIGURE 12 is an enlarged detail plan view taken from the line 12—12 of FIGURE 11.

FIGURE 13 is a cross-section of a still further embodiment.

FIGURE 14 is an enlarged detail plan view taken from line 14—14 of FIGURE 13.

FIGURE 15 is a front elevation of an additional embodiment.

FIGURE 16 is an enlarged cross-section taken along line 16—16 of FIGURE 15.

FIGURE 17 is a front elevation of still an additional embodiment.

FIGURE 18 is a detail cross-section of the embodiment shown in FIGURE 17 taken along line 18—18 of FIGURE 17.

As indicated above, spray heads made according to this invention are suitable for use in the various applications for electrostatic dispersion, but are particularly suited for electrostatic coating operations. FIGURE 1 shows diagrammatically a typical coating set-up suitable for spray heads made according to this invention. Various field-shaping electrodes, anti-sparking and current-limiting protective devices for the high-voltage potential, and the like may be employed but are omitted for simplicity of illustration. Likewise, one may employ any suitable type of mechanism for moving the spray head relative to the object during operation and for controlling the movement of the object during operation; such mechanisms are similarly omitted for simplicity of illustration.

As indicated in FIGURE 1, the spray head H is rotated by the shaft S mounted in a journal housing J carried by the stand for the motor M. The journal housing J is usually of non-conductive material or at least so insulated that a high potential insulation exists in the journal structure between the shaft S and the motor support. Similarly, the shaft is connected to the motor through an insulating coupling I to prevent the high potential applied to the head H from shorting back to the motor or stand, which, as indicated, is usually grounded for safety to operating personnel. The actual head H is connected to the shaft S through a chuck C, which is preferably mounted exteriorly of the journal housing for simplification of access in changing heads if and when required. The high electrical potential for the head is supplied from a source of high voltage HV, usually through a simple slip-ring R. Paint is supplied to the head from a nozzle N carried by the journal housing and terminating just short of the disk portion of the head H. The nozzle N is usually of non-conductive material, such as glass, and is connected to a paint supply PS through a suitable tubing T. In most cases the paint or like coating composition to be sprayed is sufficiently non-conductive, as is the tubing T, so that the pressure tank, controls, and the like at the paint supply PS may be grounded without shorting out the high potential supplied to head H. If, however, the coating composition itself is relatively conductive, due to conductive pigments or a relatively conductive vehicle or solvent in the coating composition, steps should be taken to insulate the entire paint supply system, from the nozzle N to the equipment in the paint supply equipment PS, in order to avoid shorting out the head H; in such cases the system is also usually suitably shielded to protect personnel.

The object O to be coated is suitably supported in front of the head H. In most instances the object is one of many carried by a suitable conveyor whose path of travel before the head H is in a plane parallel to the face of the head H, i.e., in a plane perpendicular to an extended axis of rotation of the head H and shaft S. The object O, which may be of a wide variety of configurations, is actually or effectively at a polarity opposite to that of the head H.

In operation, the motor M rotates the head H, paint is supplied to the head H from the nozzle N, and an electrostatic field is established by the source of high potential between the head H and the object O, said field F being indicated by the broken light lines from H to O. If the high potential to the head H is shut off, the paint will be atomized to a substantial degree by being thrown centrifugally off the outer edge of the head H in the plane indicated in FIGURE 1 by the arrows P—P extending away from the head; there will be no substantial components of travel of the paint particles so atomized toward the object O. A slight component of travel toward the object O may be imparted to the paint particles by dishing or cupping discharge points of the head H toward the object O so that the paint is carried by the head H axially toward the object as it also moves radially outwardly from the point of discharge onto the head H from the paint supply outlet, but the impetus imparted to paint particles by such axial travel is usually negligible compared to the impetus imparted by the centrifugal force moving the paint radially. In fact, since an object and purpose of the field F is to pull the paint particles discharged centrifugally by the head H from the plane P—P (in which the particles would normally travel except for the influence of the field F) and converge them toward the object O, it is preferable practice to rotate the head no more rapidly than necessary to move the paint to the edge of the head H and there break the paint into droplets sufficiently small to permit the electrostatic field to further atomize the particles into relatively weightless particles which can be carried by the electrostatic charges thereon toward the object; otherwise, a substantial amount of the paint might be thrown centrifugally out of the field F. While the rotational speed of the head will vary according to many factors (such as the potential across the electrostatic field F, the viscosity of the paint to be sprayed, and other factors including those mentioned in the preamble of this specification), with a potential gradient of approximately 10,000 volts per inch of minimum spacing from the head to the object the rotational speeds are usually in the range of 400 to 4,000 r.p.m.

In centrifugal electrostatic spray heads employed heretofore, the discharge edge of the heads, whether simple disks or cups, have uniformly been circular and concentric with the axis of rotation of the head, and careful effort has been made to secure distribution of uniform amounts of the paint to equal integers of the circular edge. To the extent that this prior art construction and distribution has been rationalized at all, it has been based on the mathematical assumption that the electrostatic charges accumulated on the edge of the head and imparted to the droplets of paint discharged therefrom would distribute themselves equally around the periphery of the circular edge. Thus, presumably, droplets of uniform volume would be uniformly thrown off the edge about the periphery, carrying uniform charges per droplet, which charges, being of the same polarity, were repulsive to each other and would thereby further atomize the droplets to fog-like particles which would be drawn by the field to the surface of the object to be coated.

The improvement effected by this invention stems from a rejection of the foregoing premise assumed by the prior art, namely, that electrostatic charges would necessarily distribute themselves uniformly about the periphery of even a circular discharge disk and, thus, that a circular discharge edge for the disk would be the optimum configuration for that edge and that paint should be fed uniformly to integers of the periphery of the disk. Such prior art spray disks discharge droplets of unequal size, especially when any substantial and economical volume of paint is supplied to the disk, resulting in the discharge of larger droplets not completely controlled by the field in their travel to the object and consequent overspray. Further, under the dynamic conditions of paint flow from the heads, it is possible, even on a circular disk, to observe that the paint evidently prefers to leave the discharge edge at fairly evenly spaced points. When spraying a coating composition comprising a solution of resinous material in a highly volatile solvent, such as an ether collodion, these preferred points of discharge will be revealed by deposits of the resinous material in the form of teeth or pins on the discharge edge, such teeth or pins pointing to the object. This invention takes advantage of and emphasizes this natural tendency by employing a non-circular disk having a plurality of apices or points at the periphery of the disk. The apices are preferably spaced at equal angles with respect to each other and the number of apices is preferably less than the number of points from which the paint would tend to discharge if the periphery of the disk were circular. Thus, when a paint would tend to discharge from about thirty to forty points about a circular disk, improved atomization appears to be obtained and a greater volume of paint may be handled by a disk having as few as three or four apices from which the substantial majority of the paint will be discharged.

Further, the paint atomized from a head made according to this invention appears to be more uniformly dispersed and the inner diameter of the cone of paint appears to be less. That is to say, when a circular prior art head is used, the paint is discharged therefrom in the form of a hollow cone; when the object is a large stationary sheet, the paint falls in a circular path, the inner diameter of which may be as much as two-thirds of its outer diameter. Paint discharged from a head made according to this invention will likewise assume the form of a hollow cone, but the inner diameter should be smaller and the outer diameter larger. Thus, where a plurality of staggered prior art spray heads may be required to cover objects passed before them, a single head or a lesser number of heads made according to this invention may be employed.

A rationalization of the operation of spray heads made according to this invention is that the several apices at the periphery tend to provide points when the charges induced by the field tend to accummulate in greater concentration or potential than if a circular periphery were employed. At the same time, although paint is discharged onto the disk uniformly about a path concentric with the axis of rotation, it will tend or may be made to flow primarily from the apices. Presumably due to the high accumulation or potential of charges adjacent the apices, paint will tend to atomize under the influence of the electrostatic field even before it reaches the points of the apices and be drawn to the object by the electrostatic field. Such paint as leaves the apices at these points is apparently now completely atomized to such relatively mass-less particles that very few leave the influence of the field in the travel from the head to the object. Other rationalizations and explanations of the operation of spray heads made according to this invention may be developed as further knowledge and understanding in the art develops.

Figure 2:
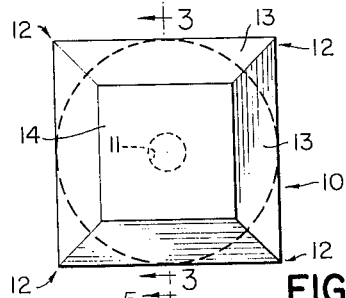
Figure 3:
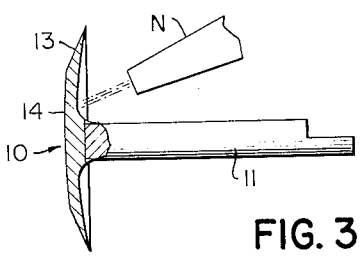

FIGURES 2 and 3 illustrate a very simple embodiment of a spray head made according to this invention. The head comprises a square disk 10 having a central perpendicular shank 11. The end of the shank 11 is suitably notched to be received in a chuck C of the set-up shown in FIGURE 1. The reverse surface of the disk 10 is preferably slightly dished to improve distribution of paint to the edges. While not necessary to successful operation of the disk 10, the reverse surface may also be grooved to guide the flow of paint more generally toward the points of the apices 12, which points are provided by the four corners of the square disk. To provide a sharp edge around the periphery and sharp points for the apices 12, a bevel 13 is ground on the margins of the disk 10. For some reason which is not understood, operation appears to be improved if the face 14 of the disk 10 within the marginal bevels is slightly convex.

With the disk 10 mounted in the chuck C of the set-up shown in FIGURE 1, paint is discharged at a metered rate onto the reverse face of the disk 10 from the nozzle N. The paint is carried centrifugally toward the apices 12, from the points and adjacent edges of which the paint is atomized and carried by the electrostatic field to the surface of the object to be painted.

Figure 4:
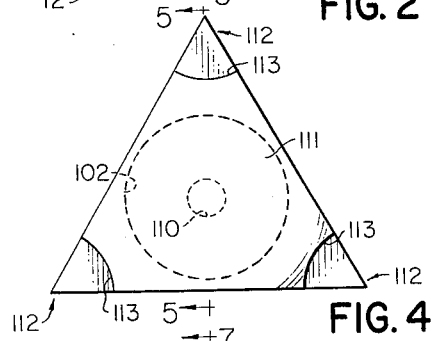
Figure 5:
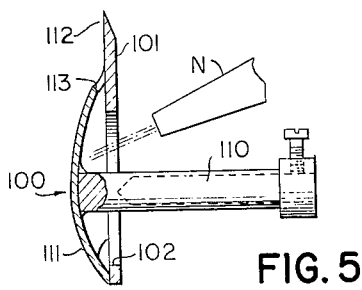

FIGURES 4 and 5 illustrate another embodiment designed to permit paint to discharge from the face of the apices as well as the edges. In this embodiment the head 100 comprises a disk 101, which, in this particular instance, is triangular. The disk 101 has a central opening 102 through which the shank 110 extends to an outwardly convex cover 111, which is united with the disk 101 at the edges of the disk intermediate the apices 112. Adjacent the apices the cover 111 is relieved to provide openings 113 through which paint may flow to the surface of the apices 112; these openings 113 may further serve as orifices to meter the amount of paint fed to the apices, if desired. In this particular instance the shank 110 is drilled to receive the shaft S, to which shaft the shank 110 can be readily attached and detached by its collar and set-screw 115.

As should be apparent, in operation paint is fed from the nozzle N through the opening 102 into the chamber provided by the disk 101 and the cover 111. From this chamber the paint flows centrifugally through the openings 113 to the apices 112, from whence it is atomized and carried by the field F to the object to be coated.

Figure 6:
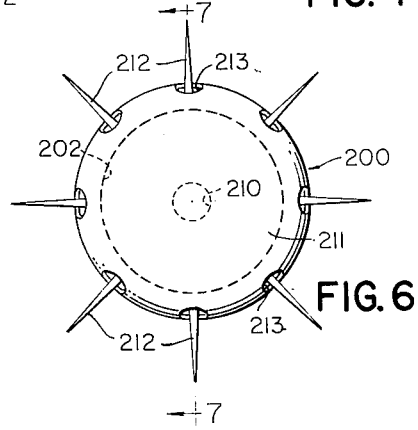
Figure 7:
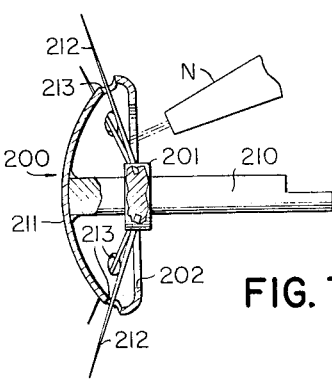

It is not necessary that the spray head apices be the corner areas of regular polygons, as shown in FIGURES 2 to 5. They may be the points of stars or even needles, as in the head 200 shown in FIGURES 6 and 7. In FIGURES 6 and 7, the shank 210 carries a boss 201 which, in turn, carries a plurality of equally angularly spaced radial needles 212. In this particular instance the needles are also inclined toward the object. The needles 212 extend through orifices 213 in a cover 211 carried by the shank 210 ahead of the boss 201. The cover 211 has its edges spun inwardly to provide a rearward opening 202. Paint fed from the nozzle N into the chamber provided by the cover 211 flows radially outwardly through the orifices 213 onto the needles 212, from whence it is atomized and carried by the electrostatic field to the object to be coated.

Figure 8:
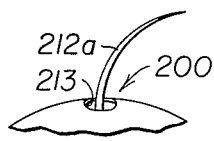

It is not necessary that apices from whence the paint is atomized extend radially from the shank but only that a suitable path or surface be provided so that some of the paint may flow to the point of an apex. Thus, as indicated in FIGURE 8, the needles of the embodiment shown in FIGURES 6 and 7 may be curved, preferably away from the direction in which the head is rotated. In this particular instance the curvature is such that the needle 212a provides a surface to which a droplet of paint might cling as the droplet would move radially outwardly under influence of centrifugal force. The curvature in this instance is determined by the rotational speed of the head and the velocity of a paint droplet as it would leave the orifice 213 of the head 200. In the operation of the head 200 at capacity, a substantial portion of paint may be observed to leave the needles 212 long before some of the paint reaches the points of these straight needles, just as in the head 10 paint will be observed to atomize from all portions of the periphery. Some of such atomization may be attributable solely to centrifugal force, rather than the electrostatic field. With the somewhat longer curved needles 212a, atomization does appear to be improved and over-spray somewhat reduced. Whether this apparently improved atomization is due to the fact that droplets making up the streams of paint carried by the curved needles are given a greater opportunity to accumulate electrostatic charges or is simply due to the fact that the droplets are carried to a point where they will be more finely atomized by centrifugal force appears to be a matter of academic theory as far as results are concerned.

Figure 9:
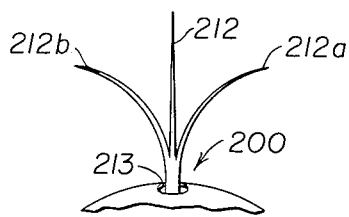
Figure 10:
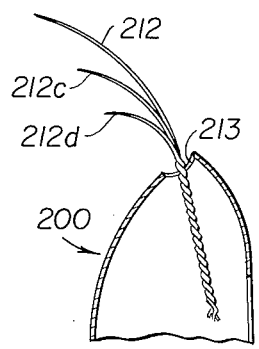

Each apex from which paint is centrifugally discharged and simultaneously electrostatically sprayed may have one or more sub-apices. Thus, the embodiment shown in FIGURE 7 may be further modified by having the radial needles shown therein suitably branched, either in a plane transverse to the axis of rotation of the head as in a plane radial to said axis or in a plane or planes skew to said axis. FIGURE 9 shows a needle 212 having branched apices 212b in a plane transverse to the axis of rotation. FIGURE 10 shows a needle 212 having branched apices 212c in a plane radial to the axis of rotation. In addition to the branching of the needles 212, as shown in FIGURES 9 and 10, the needles 212 may be otherwise varied. For example, instead of being circular in cross-section, they may be fluted, rectangular, or otherwise modified in cross-section; if non-circular, elements on the surface may be parallel to the needle axis or twisted. The orifices 213, which seem to have the effect of metering the paint which flows to the needle, may also be varied from a circular form. Thus, the inwardly directed cusps of a fluted orifice can hold a needle 212 substantially centered within the orifice opening. Other cross-sections of the orifice which are not concentric or equidistant at all points from corresponding points on the needle may, under given conditions, aid in controlling the size or rate of droplets discharged from the needles.

Figure 11:
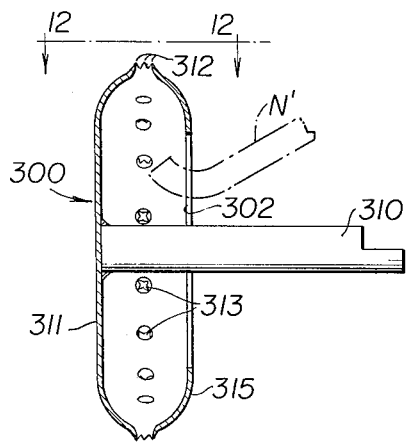
Figure 12:
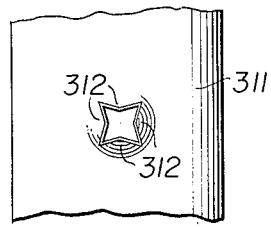

Another embodiment employing branched apices is shown in FIGURES 11 and 12. A head 300 is mounted in the shank 310 and comprises a front cover 311 having a spun-over edge 315 to provide an opening 302 into which paint may be fed from a feed pipe N' corresponding to the nozzle N shown in FIGURES 1, 3, 5, and 7. Orifices 313 are punched in the periphery of the cover 311 to provide multiple apices 312. The apices 312 not only serve to break up the paint discharged through the orifice 313 but also serve as discharge points for electrostatically atomizing the paint passing over them.

Figure 13:
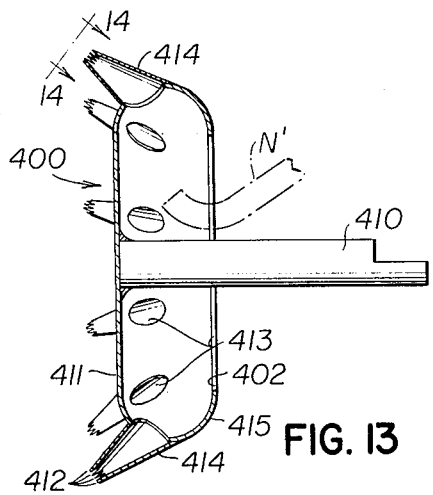
Figure 14:
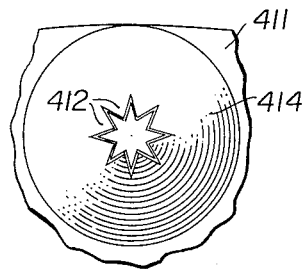

The more nearly the apices from which the paint is discharged approaches a crown having its points directed toward the receiving surface, the more effective the atomization appears to become, provided the apices also provide points which effect a locus for concentrated electrostatic charges. In accordance with this "crowning" principle, a further embodiment, constituting a variation of the embodiment shown in FIGURES 11 and 12, has been originated. Thus, as shown in FIGURES 13 and 14, a head 400 is mounted on a shank 410 and comprises a cover 411 having a spun-over edge 415 to provide a rear opening 402 into which paint may be fed through a feed pipe N'. The cover 411 is provided with orifices 413 opening into conical conduits 414 inclined toward the receiving surface. The open apex of each conical conduit 414 is preferably serrated to provide a plurality of sub-apices 412. These sub-apices, as the apices 312, serve to break up the paint discharged through the conduits and discharge points for electrostatically charging the paint passing over them.

Figure 15:
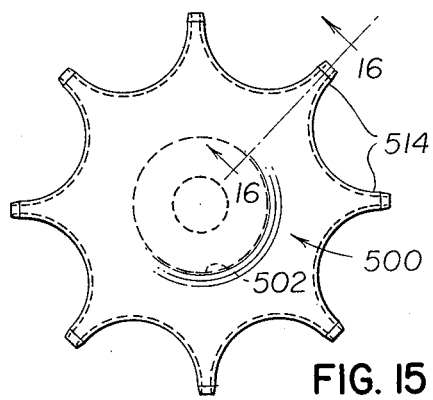
Figure 16:
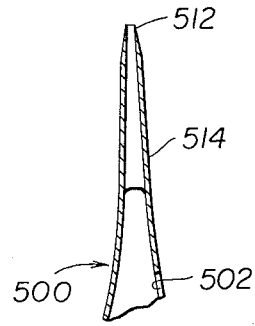

The apices from which paint is discharged does not always need to be crowned toward the receiving surface and good results can be obtained when the apices lie generally in a plane perpendicular to the axis of rotation of the spray head. Thus, as shown in FIGURES 15 and 16, a hollow head 500, having an opening 502 for receiving paint to be atomized, is shaped to provide a plurality of hollow, radially extending pins 514 terminating in apices 512. The pins are preferably beveled at the apices to provide discharge edges, as shown in FIGURE 16. As in the other embodiments, paint discharged from the apices 512 appears to be simultaneously mechanically and electrostatically atomized.

It is to be noted that in the various embodiments shown in FIGURES 4 to 16, the head, between the front cover and the paint receiving opening and radially beyond the opening, affords a capacity or volume receiving the paint discharged from the nozzle N or feed pipe N'. This volume or capacity is advantageous in that it provides a reservoir for paint to be discharged at a substantially constant rate from each apex throughout a revolution of the head. Accordingly, in the embodiments having a paint reservoir, it is generally immaterial where the paint nozzle or feed pipe be located so long as paint is discharged into the head at a rate approximately equal to the rate of discharge of paint from the head. In contrast, in the embodiment shown in FIGURES 2 and 3, the paint is generally discharged into the back of the head above the shank in order that the centrifugal force of the head may distribute the paint to the apices before the paint falls off the head under the influence of gravity; as a consequence, paint will tend to discharge within a limited arc, and the apices will tend to be starved for paint to atomize during the balance of its revolution. Without a reservoir, therefore, the volume of paint which can be handled by a spray head may be limited to substantially the amount of paint which can be atomized by the apices as they pass through the aforesaid arc. While a plurality of nozzles or feed pipes may be employed in embodiments affording no paint reservoir in order to minimize variations in discharge from each apex, where reservoir means are provided, a single nozzle or feed pipe can be sufficient to provide a substantially constant discharge and a greater total volume of discharged paint for the atomizing head.

Another feature of the embodiments discharging the paint through conduits or orifices is that the passageways may be tapered or otherwise configured to accelerate the velocity of the paint toward the apices. Such acceleration appears to aid in atomization.

Figure 17:
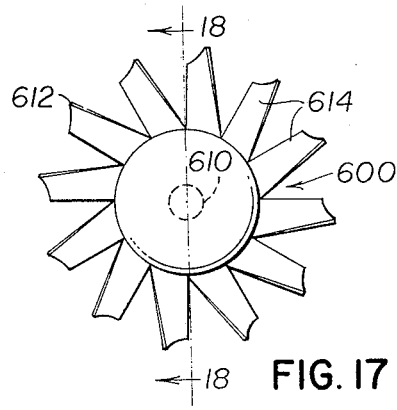
Figure 18:
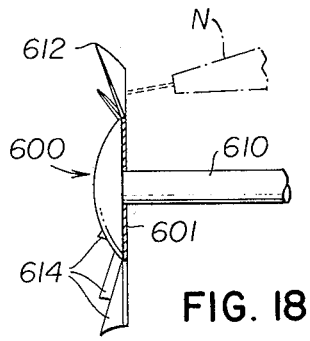

While embodiments employing accelerating conduits and/or orifices in combination with a reservoir are often preferred, embodiments without such features are often very satisfactory. In addition to such a simple feed embodiment as shown in FIGURES 2 and 3, another such embodiment is shown in FIGURES 17 and 18 in which the head 600 comprises the shank 610 carrying a disc 601 provided on its periphery with vanes 614, each vane being twisted from a plane transverse to the axis of rotation of the head toward a plane radial thereto. Paint discharged from a suitable nozzle N into the rotating vanes or onto the disc 601 will be accelerated toward the tips 612 of the vanes, which are twisted toward the receiving surface. Thus, for the purpose of this embodiment, the forward vane tips 612 constitute the apices from or near which the paint is discharged forwardly of the head after it has been discharged onto the back of the head.

In all of the foregoing specific and illustrative embodiments, it should be noted that the head may be removed from the driving shaft without having to disconnect it from the paint supply system and, further, that the construction permits ready cleaning of the head by simply dousing it in solvent. To change color or to apply a different type of coating composition, a head is simply unchucked and replaced by a clean duplicate or is quickly cleaned and replaced; the new color or type of paint is supplied from a separate paint supply system whose nozzle is clipped or otherwise secured to the journal housing.

The size of any given head and the number of apices employed depends on a number of factors, such as the area which the head is expected to coat, the amount of paint to be atomized, the potential of the field between the head and the object, the shaping of the field as objects are conveyed past the head, and the like. In general, the number of apices should approach the minimum number which can handle the volume of paint to be atomized without creation of large droplets, rather than so many apices that the disk becomes saw-toothed and paint tends to fill the gaps between the teeth; if there is a tendency of the paint to run to the gaps between the apices, dams, grooves, or covers are preferably employed to direct the flow toward the apices.

In the operation of the several embodiments, a substantial ionization of the atmosphere adjacent the apices appears to be maintained. While this ionization is presumably due to the concentration of static charges at the apices under the influence of the potential between the head and the receiving surface, but, in attempting to explain the principle of operation of this invention, it is not entirely clear what part such ionization may play in effecting the atomization and charging of the particles of paint discharged from the head. An assumption that the ionized atmosphere aids in breaking up droplets centrifugally discharged from the apices may be combined with an assumption that the charged particles discharged centrifugally from the spray head maintain ionization of the atmosphere adjacent the head.

In most of the embodiments illustrated, it is to be noted that before the paint reaches or can reach the point of an apex, it is given an appreciable distance of travel over an external surface adjacent the point of the apex. This appears to be desirable in order to give the paint an opportunity to pick up static charges as it approaches the apex. The embodiment shown in FIGS. 15 and 16, however, is one exception and may be explained on the assumption that, at the instant a droplet leaves the beveled end of a hollow pin 512, the droplet itself momentarily becomes the point of the apex and, when the droplet breaks away from the pin, at a succeeding instant, it carries with the charge concentrated at the apex.

Whether any one of the foregoing attempted explanations of the principles of operation of embodiments of this invention are later established as the correct one or entirely different theories are advanced, it is to be understood that other and different variations of this invention may be made by those skilled in the art without departing from the spirit and scope of the invention as defined in the following claims.

What is claimed is:

1. An electrostatic spray system in which atomized particles are moved at least in part by electrostatic field forces from a head to a receiving surface, a paint feeding means, a rotatable head comprising a shank, a disk structure carried by said shank and rotatable about the axis of said shank, said disk structure carrying a plurality of apices on its periphery and having surfaces connected with said shank for rotation thereby and extending toward said apices permitting apicad movement of fluent material discharged from said paint feeding means onto a portion of said surface located inwardly of said apices.

2. A spray head for electrostatic spray systems comprising a shaft for rotating said head, means for creating a potential between said head and an object to be coated, and means for conveying a coating composition to said head, said head comprising a disk structure, a plurality of spaced apices in the periphery of said disk structure, a surface in said disk structure for receiving coating composition and conveying said coating composition to said apices, and means to mount said disk structure on said shaft, whereby said apices will be rotated in a plane perpendicular to the axis of rotation of said disk structure, and said surface for receiving coating composition being located adjacent said mounting means and positioned adjacent the means for conveying a coating composition to said head, said surface being positioned by said shaft between said coating composition conveying means and said object to be coated.

3. An electrostatic discharge head comprising a disk, means for mounting said disk on a shaft for rotation in at least one plane perpendicular to the axis of rotation of said shaft, said disk having a plurality of apices in the periphery thereof and at least one surface permitting flow to said apices of coating composition discharged onto said disk between said periphery and the axis of rotation thereof, the surface of said disk receiving said coating composition being on the shaft side of said disk.

4. An electrostatic spray discharge head as defined in claim 3 in which said disk has a polygonal configuration, the outer corners of which constitute said apices, and a face and reverse surface converging to a single edge at and adjacent the points of said apices.

5. An electrostatic spray discharge head as defined in claim 4 in which the face of said disk is generally convex and the reverse surface is generally concave.

6. An electrostatic spray discharge head as defined in claim 3, in which said disk is provided with at least one opening in the reverse surface thereof, said opening permitting the flow from the reverse surface to the face of said disk adjacent the apices thereof of coating composition supplied to the reverse of said disk.

7. An electrostatic spray discharge head as defined in claim 6 wherein said opening opens into a cavity within said head, said cavity having outlets therefrom, each outlet being more adjacent an apex, in a radial direction, than said opening, whereby said cavity may serve as a reservoir for a coating composition fed into said opening and distributed to said outlets as said head is rotated, said cavity being of a sufficient volume and said outlets being sufficiently constricted to maintain a substantially constant flow of said coating composition from each outlet to its adjacent apex as said head is rotated.

8. An electrostatic spray discharge head as defined in claim 3 in which the opening in said apexed disk is a central opening through which the axis of rotation of said shaft extends and including a cover located on the face of said disk over said opening and providing openings between the face of said disk and cover adjacent said apices, whereby, when said disk is rotated, paint discharged into said openings will be distributed by said cover toward said apices and on the face of said disk.

9. An electrostatic spray discharge head as defined in claim 3 in which said apexed disk comprises a plurality of members having needle-shaped extremities extending in a direction havng at least a component radial to said shaft and means directing, when said disk is rotated, the flow of a coating composition discharged onto said disk toward the extremities of said members.

10. An electrostatic spray discharge head as defined in claim 9 in which said flow-directing means directs the flow of a coating composition over the external surfaces of said members adjacent their extremities as well as toward said extremities.

11. An electrostatic spray discharge head as defined in claim 10 in which said members beyond said flow-directing means are curved to provide a surface to which a coating composition may cling while it moves on the extremities of said members in a substantially straight linear path extending radially from the axis of rotation.

12. An electrostatic spray discharge head as defined in claim 3 in which at least one of said apices comprises a plurality of associated pointed members.

13. An electrostatic spray discharge head as defined in claim 3 in which said disk comprises a hollow member defining a cavity substantially symmetrical about the axis of rotation, said member having an opening concentric with said axis, whereby a liquid coating composition may be fed into said cavity through said opening and distributed centrifugally into the portions of the cavity located radially outward of said opening when said disk is rotated, and said member having outlets from said cavity, said outlets being located in the portion radially outward of said opening and leading to the apices of said disk.

14. An electrostatic spray discharge head as defined in claim 13 in which said passageways lead to a plurality of teeth constituting an apex of said disk.

15. An electrostatic spray discharge head as defined in claim 13 in which said passageways are defined by tubular members whose tips constitute the apices of the disk.

16. An electrostatic spray discharge head as defined in claim 15 in which said tubular members extend in a direction both axially and radially divergent from said axis of rotation, whereby the tubular members may impart to the coating composition moving therethrough an impetus in the direction of the object to be coated.

17. An electrostatic spray discharge head as defined in claim 15 in which said tubular members are provided with a varying cross-section.

18. An electrostatic spray discharge head as defined in claim 3 in which said disk is provided with radially extending, angularly spaced vane members, the radially outer tips of which vane members constitute the apices of said disk.

19. An electrostatic spray discharge head as defined in claim 18 in which said radially outer tips of said vane members are twisted axially forward of said shaft.

References Cited in the file of this patent

UNITED STATES PATENTS

| | | |
|---|---|---|
| 1,753,019 | Page | Apr. 1, 1930 |
| 2,685,536 | Starkey et al. | Aug. 3, 1954 |
| 2,893,893 | Crouse | July 7, 1959 |
| 2,961,581 | Grave et al. | Nov. 22, 1960 |